Jan. 21, 1936.　　W. STUEBING, JR　　2,028,708
MULTIPLE STAGE LIFTING TRUCK
Filed Sept. 13, 1930　　3 Sheets-Sheet 2

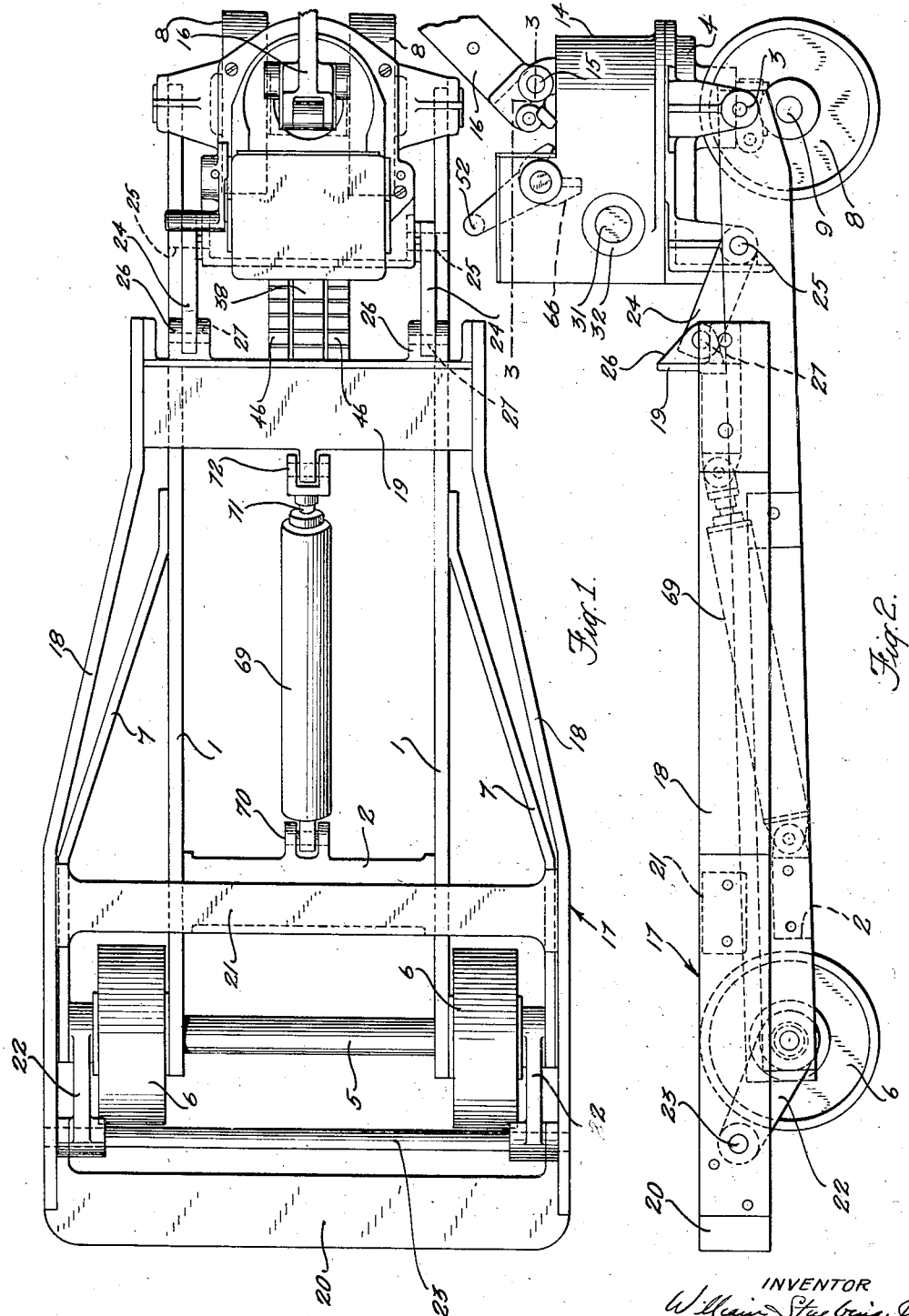

INVENTOR
William Stuebing Jr.
BY
Janney, Blair & Curtis
ATTORNEYS

Jan. 21, 1936.  W. STUEBING, JR  2,028,708
MULTIPLE STAGE LIFTING TRUCK
Filed Sept. 13, 1930   3 Sheets-Sheet 3
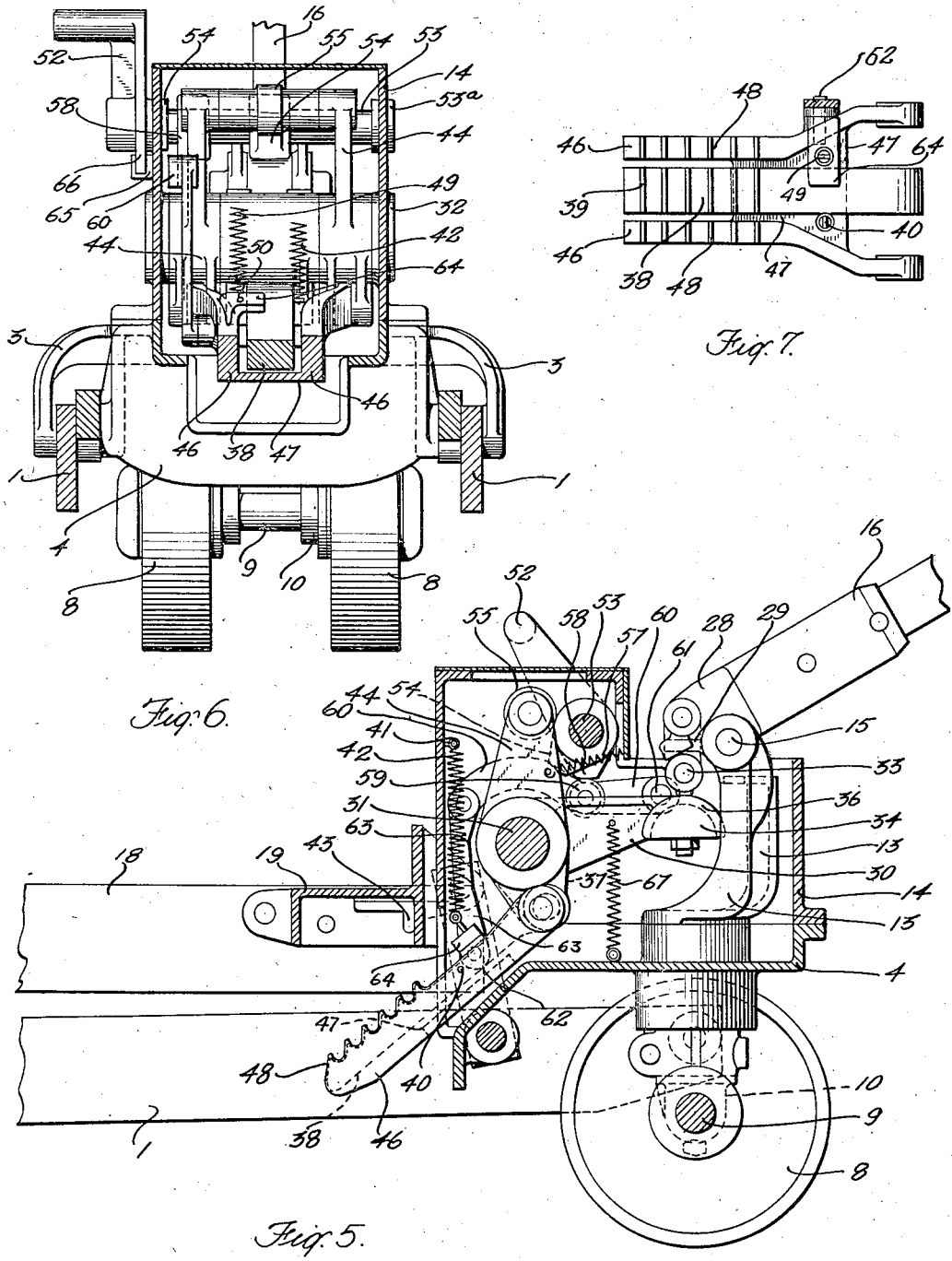

Patented Jan. 21, 1936

2,028,708

UNITED STATES PATENT OFFICE 2,028,708

MULTIPLE STAGE LIFTING TRUCK

William Stuebing, Jr., Cincinnati, Ohio, assignor to The Yale & Towne Manufacturing Company, Stamford, Conn., a corporation of Connecticut Application September 13, 1930, Serial No. 481,687

39 Claims. (Cl. 254—10)

The invention relates to lifting trucks, and more particularly to multiple stage lifting trucks. In the accompanying ddrawings in which is shown one of various possible embodiments of the mechanical features of this invention, Fig. 1 is a plan view of a truck embodying the invention.

Fig. 2 is an elevation of the right hand side of the truck.

Fig. 5 is a longitudinal partial section of Fig. 3, along the line 5—5 Fig. 4 and showing the mechanism in the released position with the frame about to descend.

Fig. 6 is a vertical sectional view taken on the line 6—6 of Fig. 4, and

Fig. 7 is a plan view showing the operating hooks detached from the truck.

Figure 3:
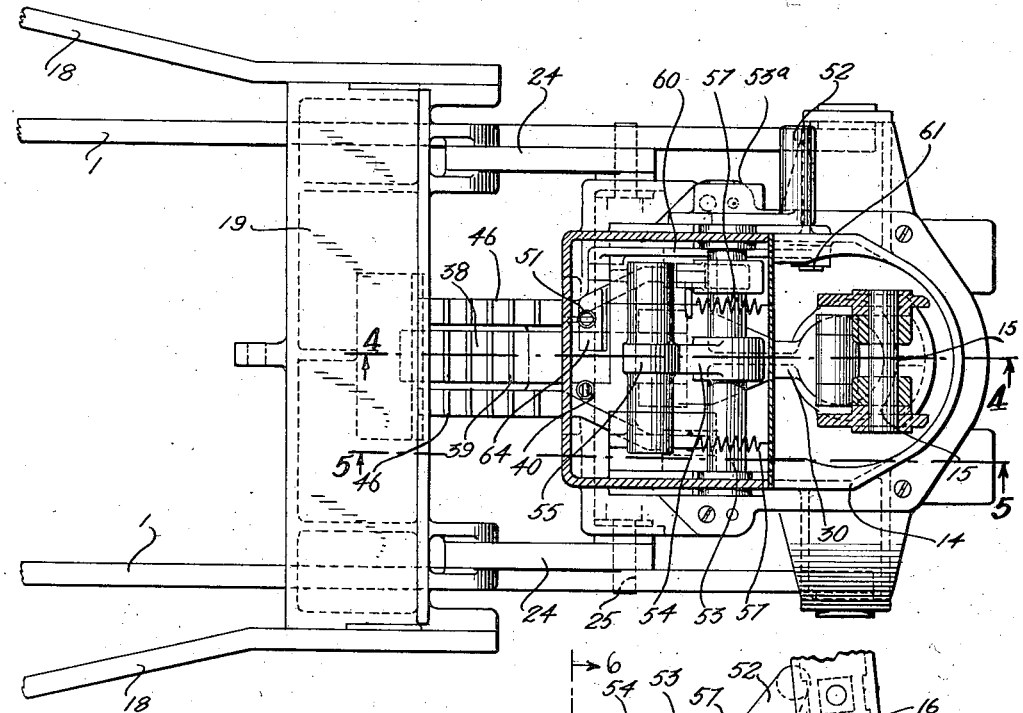
Fig. 3 is a horizontal sectional view on an enlarged scale, taken on the line 3—3 of Fig. 2.

Referring first to Figs. 1 and 2, the frame of the truck comprises a pair of longitudinal members 1, 1 connected near the rear end of the vehicle by means of a transverse frame member 2, and connected at the front of the vehicle by means of downwardly extending legs 3, 3 of a lower casing 4. At the rear of the truck is an axle 5 upon which are journalled the rear wheels 6, 6; the axle 5 extends between the frame members 1 and may be secured to them. As best shown in Fig. 1, connecting the ends of the axle 5 to the longitudinal members 1, 1 are braces 7, 7 which are desirably provided in order to strengthen the truck frame.

Figure 4:
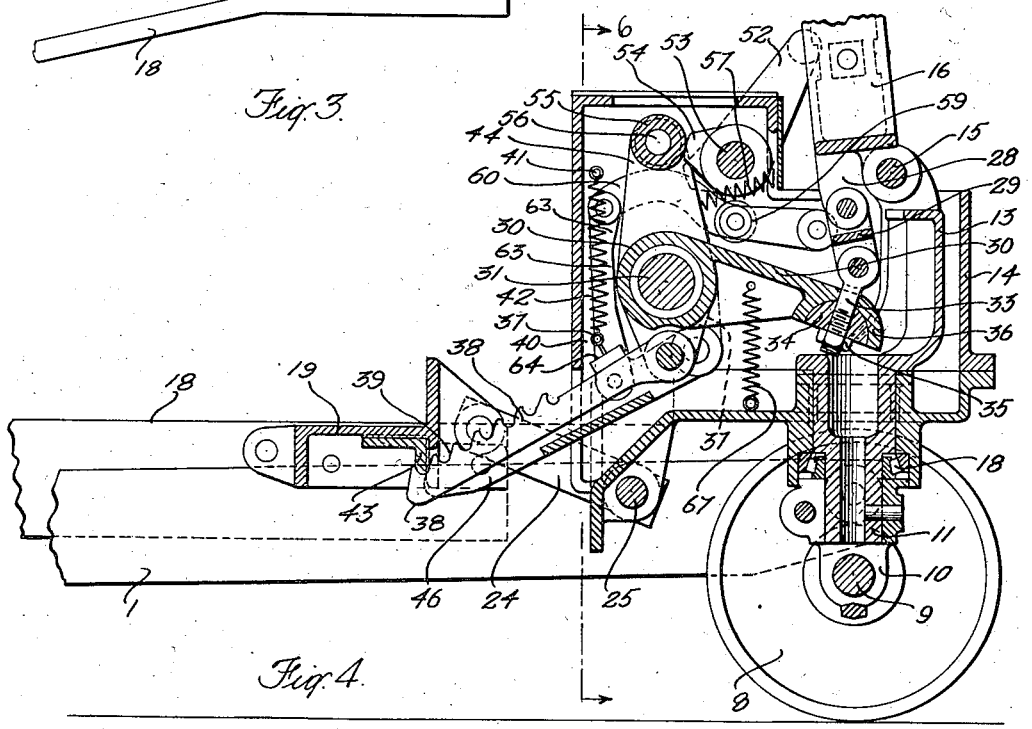
Fig. 4 is a vertical partial section taken along the line 4—4 of Fig. 3 showing the mechanism in lifting position with the lifting frame down.

Referring now to Figs. 4 and 6, and especially to Fig. 4, the front wheels 8, 8 are mounted on an axle 9 which passes through a fork 10, which is suitably secured to a column 11 that is pivotally mounted on a vertical axis in the lower casing 4, the weight of the truck being supported by an anti-friction bearing 18 which insures an easy swivelling of the front wheels 8, 8. Still referring to Fig. 4, the column 11 has an upright extension 13 which is offset from the axis of rotation and which extends through an upper casing 14; as shown in Figs. 3 and 4, the top of the extension 13 is forked and supports a short shaft 15 which constitutes a pivotal mounting for movement in a vertical plane of a steering tongue 16, by means of which the vehicle may be drawn, and by means of which in this embodiment of the invention, the lifting frame is elevated, as will be presently described.

Referring again to Figs. 1 and 2, the truck has a lifting frame already referred to which is generally designated by the numeral 17. This frame 17 may be of any suitable construction; as shown in Fig. 1, it comprises a pair of side bars 18, 18 which at their front ends are connected by a saddle 19, and at their rear ends are joined by a transverse member 20. Desirably also an additional transverse member 21 is provided for extra strength. The lifting frame 17 is mounted for vertical movement with respect to the truck frame, the connection between frame 17 and the truck being preferably made by means of linkage mechanism.

As best shown in the left hand portions of Figs. 1 and 2, a pair of links 22, 22 are pivotally mounted at one end on the rear axle 5, and are pivotally mounted at the other end on a transverse shaft 23 extending between the side bars 18, 18 and secured thereto. As best shown near the central portion of Figs. 3 and 4, another pair of links 24, 24 are pivotally mounted at their lower ends on studs 25, 25 which are secured in a rearwardly extending portion of the lower casing 4 and which extend through the longitudinal members 1, 1. The upper ends of the links 24, 24 are pivotally connected to the saddle 19, as by means of suitable ears 26, 26 formed on the front portion of said saddle and pins 27, 27 extending between the respective pairs of ears.

The frame 17 is adapted to be lifted by vertical oscillation of the steering tongue 16. A single oscillation of the steering tongue 16 lifts the frame, but only a limited distance, and holding means are provided to hold the lifting frame after each actuation by the steering tongue 16. The action of both the lifting apparatus and the holding means is a ratcheting action. By reason of the connections which will be described, the steering tongue 16 may be oscillated to lift the frame, irrespective of the angle of the fork 10 and wheels 8, 8 with respect to the vehicle, and irrespective of the position in a horizontal plane of the steering tongue 16.

Referring now particularly to the right hand upper portion of Fig. 4, the steering tongue 16 provides a forked portion 28 which is connected by means of a link 29, a stud 33, a hemispherical member 34, and a nut 35, to a bell crank lever 30 which is journalled on the central portion of a transverse shaft 31 supported, as best shown in Fig. 6 by thickened portions 32, 32 of the upper casing 14. The hemispherical member 34 fits in a cup-shaped portion 36 provided on the front end of the bell crank lever 30. The link 29 and stud 33 are located substantially along the axis of the column 11, so that angular movement in the horizontal plane of the steering tongue 16 serves only to turn them and does not displace them from the central position shown. As such angular movement results only in rotation of the hemispherical member 34 in the cup-shaped portion 36, it is without effect upon the bell crank lever 30. Angular movement in a vertical plane, however, of the steering tongue 16 raises and lowers the right hand end of the bell crank lever 30; when the steering tongue 16 is depressed, the bell crank lever is turned in a counter clockwise direction, Fig. 4.

Referring to Figs. 4 and 5, pivotally mounted on the downwardly extending arm 37 of the bell crank lever 30 is a lifting hook 38 which, as clearly shown in these figures, has a plurality of teeth 39 formed in its upper surface. As shown in Figs. 3, 5, and 7, extending between a pin 40 on the side of the hook 38, and a pin 41 on an inner wall of the upper casing 14, is a spring 42 which, as shown in Fig. 4, maintains one of the teeth 39 of the hook 38 in engagement with a lug 43 secured to the under side of the saddle 19, excepting when the hook 38 is positively forced downwardly to the position shown in Fig. 5, as will be hereinafter described.

As clearly shown in Fig. 6, pivotally mounted upon the shaft 31, and on both sides of the bell crank lever 30, are a pair of levers 44, 44, upon the lower ends of which are pivotally mounted the ends of a holding hook which, as clearly shown in Fig. 6, preferably provides hook portions 46, 46 on either side of the hook 38, said portions being joined by an integral web 47, and having, as shown in Figs. 3, 5, and 7, teeth 48, 48, likewise adapted for engagement with the lug 43. Located near the spring 42 is a spring 49 which extends between a pin 50 secured to the holding hooks 46, and a pin 51 attached to the upper casing 14, said spring serving to maintain the teeth 48 of the hooks 46 in engagement with the lug 43, excepting when said hooks are positively lowered, as will be hereinafter set forth.

Referring particularly to the right hand portions of Figs. 1 and 2, and the upper left hand side of Fig. 6, on the outside of the upper casing 14 I provide a controlling lever 52, by means of which the operator may set the mechanism to elevate or release the frame 17. Assuming that the frame 17 is in its lowermost position, when the lever 52 is in its rearward position, as shown in Fig. 5, raising and lowering of the steering tongue 16 has no effect whatsoever upon the lifting frame 17, and the truck handles just as though it were not equipped with any lifting mechanism at all. Assuming now that the lever 52 is brought forward to the position shown in Fig. 4, the lifting frame 17 may then be elevated by oscillating the steering tongue 16. Assuming that the lifting frame 17 is elevated, either partially or to its uppermost position, so long as the controlling lever 52 remains forward, the frame 17 is maintained in such position of partial or complete elevation. When it is desired to lower the frame 17, the lever 52 is moved rearwardly, whereupon the frame 17 descends by its own weight, aided by the load upon it, if any, and checked by a suitable check device, which will be referred to hereinafter.

Referring now to Figs. 3 and 4, the controlling lever 52 is fastened to a horizontal shaft 53 which is suitably journalled in bosses 53a, 53a provided by the upper casing 14. Referring to Figs. 5 and 6, on the central portion of the shaft 53 is fastened a cam 54 which is engaged by a roller 55 on a shaft 56 that connects the upper ends of the levers 44, 44 that, as will be remembered, pivotally supports the holding hooks 46, 46. As shown in Figs. 3 and 4, the roller 55 is urged against the cam 54 by means of springs 57, 57 connecting the levers 44, 44 and portions of the upper casing 14, and also, when the holding hooks 46, 46 are holding the frame 17, by the weight of said frame and the load upon it, if any.

Referring now to Figs. 5 and 6, the shaft 53 has fastened to it another cam 58 which, when the controlling lever 52 is moved to its rearward position, as shown in Fig. 5, engages a roller 59, mounted on a lever 60, that is pivotally mounted at 61 on the left hand inner side of the upper casing 14.

Referring to the left hand upper portions of Figs. 4 and 5, connecting the rear end of the lever 60 with a stud 62, on one side of the holding hooks 46, is a link 63. When the controlling lever 52 is in its forward position, as shown in Fig. 4, the cam 58, or at least the outer portion thereof, does not engage the roller 59, and consequently the holding hook 46 is urged upwardly by means of the spring 49, as already described, and the lever 60 assumes the position shown in Fig. 4. When, however, the controlling lever 52 is moved to its rearward position, as shown in Fig. 5, the cam 58 engages the roller 59 forcing the lever 60 downwardly and thus, by means of the link 63, forcing downwardly the holding hooks 46. Such action likewise lowers the lifting hook 38, moving the teeth 39 thereof out of engagement with the lug 43 by reason of the fact that, as most clearly shown in Figs. 6 and 7, the holding hooks 46 have a projection 64, which projection overlies the lifting hook 38.

The truck of the invention is adapted to be used wherever loads are to be conveyed from place to place, the load being placed upon a skid, not shown, having side supports which just allow the lifting frame 17 to be backed under the skid when said frame is in its lowermost position, as shown in Fig. 2. Assuming that this has already been done, the apparatus may be operated to lift the lifting frame 17, and thus cause the truck to take the skid, with its load, by moving the controlling lever 52 forwardly, said controlling lever being provided with a stop 65 which limits the forward position of the controlling lever by engagement with a stationary stop 66, and then oscillating the steering tongue 16 up and down. It may here be noted that part, at least, of the weight of said steering tongue 16 may be taken by means of a spring 67 which, as clearly shown in Figs. 4 and 5, extends between the bell crank lever 30 and the bottom of the lower casing 4, thus urging said bell crank lever 30 in a clockwise direction, as viewed in these figures, tending to raise the steering tongue 16.

The forward positioning of the controlling lever 52 allows both the holding hooks 46 and the lifting hook 38 to move upwardly under the influence of the springs 42 and 49, and it also causes the cam 54 to engage the roller 55, thus moving the levers 44, 44 in a counter clockwise direction, Figs. 3 and 4, to the position shown in Fig. 4, thus disposing the holding hooks 46, 46 in their forward position. During the lifting operation said hooks maintain said forward and upward position, being merely slightly depressed each time the lug 43 passes over one of the teeth 48.

The oscillation of the steering tongue 16, by reason of the connections which have been described, causes oscillation of the bell crank lever 30, and this causes the lifting hook 38 to move in a generally inclined direction. As the lifting hook 38 oscillates, it lifts the lifting frame 17 by stages, the frame gradually rising upon the links 22, 22 and 24, 24, the frame being held by the holding hooks 46 during backward movement of the lifting hook 38. Ultimately the skid will be lifted from the ground or floor by the lifting frame 17, and the operator may cease working the steering tongue 16 up and down as soon as there is sufficient clearance to permit the truck to be readily moved about, and the lifting frame will be maintained in elevated position upon the links 22, 22 and 24, 24 by the holding hooks 46.

When it is desired to lower the lifting frame, the operator merely moves the controlling lever 52 rearwardly to the position shown in Fig. 5. This action first moves the cam 54 out of engagement with the roller 55, thus allowing the levers 44, 44 to be moved clockwise (Fig. 4) under the influence of the springs 57, 57.

Referring now to the central portion of Figs. 1 and 2, connecting the transverse member 2 of the truck frame and the saddle 19 of the lifting frame is a check device which is shown as comprising a cylinder 69 pivotally attached to the member 2 at 70, said cylinder having a piston whose piston rod 71 is pivotally attached at 72 to the saddle 19. This check device may be of any suitable type, and serves to prevent too rapid descent of the lifting frame 17.

Reverting now to the operation of the truck of this invention, it was last stated that by moving the control lever 52 rearwardly, the holding hooks 46, 46 were moved to the left (Fig. 5). This action takes place reasonably rapidly, under the influence of the springs 57, 57; more rapidly than the motion of the lifting frame downwardly, which, assuming it was in an elevated position, as shown in Fig. 5, is urged to the left and downwardly by gravity and the spring in the check cylinder 69, but is restrained from rapid motion by the checking means in the cylinder. It will be noted that in the position of the parts shown in Fig. 5, which is the position momentarily assumed after the lever 52 is moved to its extreme left position, the weight of the frame 17 and load is almost supported by the links 22, 22 and 24, 24.

From what has been stated, it will be clear that the first part of the movement of the lever 52 causes whatever teeth 48 of the hook portions 46, 46 that were in engagement with the lug 43, to move away from it in the direction of the pressure between these parts. Immediately subsequent to this action, the cam 58 depresses the roller 59, thus moving downwardly the lever 60 and depressing the hook portions 46, 46. The lifting hook 38 is simultaneously depressed by the projection 64. The frame 17, which is thus released, descends slowly under the influence of the check device 69. By reason of the above combination of elements, the lifting frame 17 may be released, no matter how heavy a load it supports, by an effortless movement of the lever 52, as there is no friction to be overcome in separating a pair of teeth 48 of the holding hooks 46, 46 from the lug 43.

As many possible embodiments may be made of the above invention, and as many changes might be made in the embodiment above set forth, it is to be understood that all matter hereinbefore set forth, or shown in the accompanying drawings, is to be interpreted as illustrative and not in a limiting sense.

I claim:

1. In a lifting truck, in combination, a truck frame, a lifting frame, a hook having a plurality of teeth provided by one of said frames, a second hook having a plurality of teeth also provided by one of said frames, means provided for interaction with the hooks, the hooks and the means comprising a pair of ratchet devices the coacting elements of which are carried by said truck and lifting frames, a steering tongue, connections between said steering tongue and one of said hooks to oscillate the latter upon oscillation of the tongue thereby to lift the lifting frame, resilient means urging both hooks into engagement with the means provided for interaction with them, cam means to urge one of the hooks away from the means provided for inter-action with it in the direction of the pressure between them, cam means to depress both hooks, and a controlling lever to actuate both of said cam means to release the lifting frame.

2. In a lifting truck, in combination, a truck frame, a lifting frame, a horizontal shaft mounted in the truck frame, a pair of levers mounted on said shaft, a lifting hook pivotally mounted upon one lever, a holding hook pivotally mounted upon the other lever, a lug associated with the lifting frame adapted to be engaged by the aforesaid hooks, spring means urging both of said hooks into engagement with said lug, a stop carried by one of said hooks adapted to engage the other hook, a steering tongue provided by the truck frame, connections between the steering tongue and one of the levers to oscillate the lifting hook, means to move the other of said levers, and means connected to one of said hooks to move them away from the lug.

3. In a lifting truck, in combination, a truck frame, a lifting frame, a steering tongue mounted for vertical and horizontal pivotal movement in said frame, a bell crank lever mounted for oscillation in said truck frame, swivel connections between said steering tongue and said bell crank lever whereby vertical movement of said steering tongue oscillates said bell crank lever in any position of said steering tongue in the horizontal plane, a holding hook comprising a member having teeth on its upper surface pivotally carried by said bell crank lever, a lug provided by the lifting frame adapted to be engaged by the said hook, spring means urging said teeth against said lug, and means to move said hook to release said frame.

4. In a lifting truck, in combination, a truck frame, a lifting frame, a horizontal shaft supported by said truck frame, a lever mounted upon said shaft, a holding hook pivotally carried by said lever, said holding hook having a plurality of teeth on one of its surfaces, a lug associated with the lifting frame adapted to be engaged by said teeth, resilient means normally urging said teeth against said lug, a link connected to said holding hook, cam means to depress said link, and cam means to move said lever, whereby to move the tooth engaging the lug away from it along the line of the pressure between them and to move said teeth out of range of said lug.

5. In a lifting truck, in combination, a lifting frame, a lifting hook having a plurality of teeth or notches, a holding hook having a plurality of teeth or notches, means associated with said frame adapted for engagement by said hooks, means for oscillating said lifting hook, a check device to resist sudden lowering of said frame, and means for first moving said holding hook in a direction generally parallel to the direction of oscillation of said lifting hook and to then lower both hooks, thereby first shifting the weight to the check device and thereupon moving both hooks out of engagement with the means provided by the frame, such disengaging movement occurring when there is no load upon either hook.

6. In a lifting truck, in combination, a lifting frame, a lifting hook having a plurality of teeth or notches, a holding hook having a plurality of teeth or notches, means associated with said frame adapted for engagement by said hooks, means for oscillating said lifting hook, a check device to resist sudden lowering of said frame, and means to control the positions of both hooks to move them into or out of engagement with the aforesaid means provided by the frame, in order to hold the frame at various stages of elevated position and to release it.

7. In a lifting truck, in combination, a lifting frame, a lifting hook having a plurality of teeth or notches, a holding hook having a plurality of teeth or notches, means associated with said frame adapted for engagement by said hooks, means for oscillating said lifting hook, a check device to resist sudden lowering of said frame, means to depress both hooks, and means to move the holding hook in a direction substantially parallel to the direction of oscillation of said lifting hook.

8. In a lifting truck, in combination, a lifting frame, a lifting hook having a plurality of teeth or notches, a holding hook having a plurality of teeth or notches, means associated with said frame adapted for engagement by said hooks, means for oscillating said lifting hook, and means to control the positions of both hooks to move them into or out of engagement with the aforesaid means associated with the frame, in order to hold the frame in various stages of elevated position and to release it.

9. In a lifting truck, a frame, a lifting hook to lift said frame, means associated with the frame adapted to be engaged by the hook, a lever to oscillate the hook, spring means to urge the hook toward the means associated with the frame, a holding hook adapted to engage the means provided by the frame, an operating connection to position said holding hook with respect to the means associated with the frame, and cam means to actuate the last-named means, whereby to raise or lower the lifting frame at will.

10. In a lifting truck, a frame, a lifting hook to lift said frame, a holding hook to hold said frame in an elevated position, a lug associated with said frame adapted to be engaged by said hooks, spring means to urge said lifting hook into engagement with said lug, spring means to urge said holding hook into engagement with said lug, means to depress said holding hook, and means to depress said lifting hook.

11. In a lifting truck, a frame, a pair of hooks, one adapted to lift the frame and the other adapted to hold it, mountings for each of said hooks to permit it to be depressed, mountings for each of said hooks to permit it to be moved generally parallel to the plane of the teeth provided thereby, and controlling means to control the positions of both hooks.

12. In a lifting truck, a frame, a lifting hook to lift said frame, means associated with the frame adapted to be engaged by the hook, a lever to oscillate the hook, spring means to urge the hook toward the means associated with the frame, a holding hook adapted to engage the means associated with the frame, and an operating connection to position said holding hook with respect to the means associated with the frame whereby to raise or lower the lifting frame at will.

13. In a lifting truck, in combination, a frame, means to elevate said frame, a holding hook to hold said frame in an elevated position, a lever to which said holding hook is pivotally attached, means for moving said lever, a link connected at one end to said holding hook, and means for moving said link whereby to give said holding hook a motion to cause it to release said frame.

14. In a lifting truck, a frame, a holding hook, a lever to which said holding hook is attached, cam means to move said lever, operating means for said cam, a second lever, a connection between said second lever and said holding hook, and operating means for said second lever.

15. In a lifting truck, a frame, a holding hook to hold said frame in an elevated position, a lever to which said holding hook is attached, spring means to raise said lever to cause it to hold said frame, and mechanism for lowering said holding hook to cause it to release said frame.

16. In a lifting truck, in combination, a frame, a lifting hook to lift said frame, a steering tongue for said truck, a bell crank lever to which said hook is pivotally attached, and a swivelling connection between said bell crank lever and said steering tongue.

17. In a lifting truck, a frame, a lifting hook to lift said frame, a holding hook to hold said frame in an elevated position, and a single lever and connections to lower both hooks.

18. In a lifting truck, in combination, a frame, a lifting hook to lift said frame, a holding hook to hold said frame in an elevated position, a single lever and connections to lower both hooks, and means for oscillating said lifting hook.

19. In a lifting truck, in combination, a truck frame, a lifting frame, a steering tongue for the truck, a hook having a plurality of teeth for raising said lifting frame, a second hook having a plurality of teeth for holding the lifting frame, a lever carrying said last-named hook, and a control member to effect disengagement of both hooks.

20. In a lifting truck, in combination, a truck frame, a steering column, a lifting frame carried by the truck frame, a steering tongue pivotally connected to said column, a link connected to the tongue and located substantially along the axis of the column, and ratchet mechanism for raising said lifting frame connected to be actuated by said link, including a lever having a cup-shaped portion, and a hemispherical member fitting in said cup-shaped portion, said hemispherical member being located close to the axis of said column.

21. In a lifting truck, in combination, a truck frame, a steering column provided by said truck frame, a lifting frame carried by said truck frame, a steering tongue pivotally connected to said column, a link connected to the tongue, and ratchet mechanism for raising said lifting frame connected to be actuated by said link, including a horizontal shaft carrying a pair of levers, hooks pivotally mounted on said levers, and a lug provided by the lifting frame adapted to be engaged by said hooks, said hooks each having a plurality of teeth.

22. In a lifting truck, in combination, a steering column, a lifting frame, a steering tongue pivotally connected to said column, a link connected to said tongue, and ratchet mechanism for raising said lifting frame, including a lever connected to said link, a hook having a plurality of teeth carried by said lever, a spring for urging said lever in one direction, and means provided by the lifting frame adapted to be engaged by said hook.

23. In a lifting truck, in combination, a truck frame, a lifting frame, a pair of holding hooks having a plurality of teeth carried by one of said frames, means adapted to be engaged by the teeth of said hooks carried by the other of said frames, and a pair of levers mounted on a generally horizontal axis holding said hooks.

24. In a lifting truck, in combination, a truck frame, a lifting frame, a pair of holding hooks having a plurality of teeth carried by one of said frames, means adapted to be engaged by the teeth of said holding hooks carried by the other of said frames, a pair of axially mounted levers holding said hooks, and a controlling lever to move said levers to release the pressure between them and the means carried by the other frame.

25. In a lifting truck, in combination, a truck frame, a lifting frame, a pair of holding hooks having a plurality of teeth carried by one of said frames, means adapted to be engaged by the teeth of said holding hooks carried by the other of said frames, a pair of axially mounted levers holding said hooks, a controlling lever to move said levers to release the pressure between them and the means carried by the other frame, and means to move said hooks angularly about their pivotal support.

26. In a lifting truck, in combination, a truck frame, a lifting frame, a pair of holding hooks having a plurality of teeth carried by one of said frames, means adapted to be engaged by the teeth of said holding hooks carried by the other of said frames, a pair of axially mounted levers holding said hooks, a controlling lever to move said levers to release the pressure between them and the means carried by the other frame, and means to move said hooks angularly about their pivotal support, said means being operated from said controlling lever.

27. In a lifting truck, in combination, a truck frame, a lifting frame, a pair of holding hooks having a plurality of teeth carried by one of said frames, means adapted to be engaged by the teeth of said holding hooks carried by the other of said frames, a pair of axially mounted levers holding said hooks, a controlling lever to move said levers to release the pressure between them and the means carried by the other frame, means to move said hooks angularly about their pivotal support, said means being operated from said controlling lever, and spring means to urge said hooks into engagement with the means carried by the other frame.

28. In a lifting truck, in combination, a truck frame, a lifting frame, a lifting hook having a plurality of teeth to lift said lifting frame by a ratcheting action, a holding hook having a plurality of teeth to hold said lifting frame in various positions, and a connection between said hooks to cause them to release the lifting frame substantially simultaneously.

29. In a lifting truck, a lifting frame, a holding hook to hold said frame in an elevated position, and means for moving the hook out of holding position in the direction of the line of its holding pressure.

30. In a lifting truck, a lifting frame, a holding hook to hold said frame in an elevated position, means mounting said hook to maintain the same in holding position, and means whereby said mounting means are movable to shift said hook out of holding position by moving the same in the line of its holding pressure.

31. In a lifting truck, a lifting frame, a holding hook to hold said frame in an elevated position, means mounting said hook to maintain the same in holding position, and means whereby said mounting means are movable to shift said hook out of holding position by moving the same in the line of its holding pressure, and additional means adapted to move said hook from holding position after the initial release movement thereof.

32. In a lift truck having a truck frame with a front crosshead, an operating handle, and a movable frame pivotally linked to the truck frame, in combination, an arm pivoted on the crosshead, means connecting the arm to said handle so as to permit oscillation of the arm by the handle, a pawl and a ratchet device connecting the arm to the movable frame, one element of which device is carried by the movable frame and the other pivoted to the free end of said arm, yieldable means for maintaining said elements in engagement, and means for holding the movable frame in each of its elevated positions.

33. In a lift truck having a truck frame with a front crosshead, an operating handle, and a movable frame pivotally linked to the truck frame, in combination, means for raising the movable frame comprising an arm pivoted on the crosshead, means connecting the arm to said handle so as to permit oscillation of the arm by the handle, a pawl and ratchet device connecting an end of the arm to the movable frame, one element of which device is carried by the movable frame and the other pivoted to the end of said arm, and yieldable means for maintaining said elements in engagement, and a multiple pawl and ratchet device for holding the movable frame in its elevated positions, one member of which is secured to said movable frame and the other to said crosshead.

34. In a lift truck having a truck frame with a front crosshead, an operating handle, and a movable frame pivotally linked to the truck frame, in combination, means for raising said movable frame comprising an arm pivoted on the crosshead, means connecting said arm to said handle so as to permit oscillation of the arm by the handle, a rack bar pivoted to the free end of the arm and extending downwardly therefrom, and means on said movable frame forming a pawl, means urging the rack into engagement with said pawl, and means for holding the movable frame in its raised position comprising a pawl and ratchet device one element of which is mounted on said crosshead, and the other on said movable frame, a member for releasing said pawl and ratchet device to permit the movable frame to descend, and means for cushioning said frame in its descent.

35. In a lift truck having a truck frame with a front crosshead, an operating handle, and a movable frame pivotally linked to the truck frame, in combination, means for raising said movable frame comprising an arm pivoted on the crosshead, means connecting said arm to said handle so as to permit oscillation of the arm by the handle, a bar pivoted to the free end of the arm and extending downwardly therefrom, and interengaging means on said bar and movable frame, and means for holding the movable frame in any one of a plurality of raised positions comprising interengaging members, one of which is mounted on said crosshead, and the other on said movable frame, a member for releasing said interengaging members to permit the movable frame to descend, and means for cushioning said frame in its descent.

36. A multiple-lift truck having, in combination, a truck frame mounted on wheels, a movable frame pivotally linked to the truck frame, means for raising the movable frame comprising a pawl and ratchet device one element of which is mounted on the truck frame and the other on the movable frame, and means for holding the movable frame in any one of a plurality of raised positions comprising a second pawl and ratchet device, one element of which is mounted on said truck frame, and the other on said movable frame, means for releasing said second pawl and ratchet device to permit the frame to descend, and means for cushioning said frame during its descent.

37. In a lift truck having a truck frame with a front crosshead, an operating handle, and a movable frame pivotally linked to the truck frame, in combination, means for raising said movable frame comprising a pawl and ratchet device and means for connecting one element of said pawl and ratchet device to said handle so as to permit of operation of the device by oscillatory movement of the handle, means for holding said movable frame in any one of a plurality of elevated positions comprising a second pawl and ratchet device, one element of which is mounted on said crosshead and the other on said movable frame, a member for releasing said second pawl and ratchet device to permit descent of the movable frame, and means for cushioning the descent of the frame when released.

38. In a lift truck having a truck frame with a front crosshead, an operating handle, and a movable frame pivotally linked to the truck frame, in combination, means for raising said movable frame comprising a pawl and ratchet device and means for connecting one element of said pawl and ratchet device to said handle so as to permit of operation of the device by oscillatory movement of the handle, means for holding said movable frame in any one of a plurality of elevated positions comprising a second pawl and ratchet device having a plurality of holding positions, one element of which is mounted on said crosshead and the other on said movable frame, means for releasing said second pawl and ratchet device to permit descent of the movable frame, and means for controlling the descent of the frame when released from one position to another.

39. In a lift truck having a truck frame with a front crosshead, an operating handle, and a movable frame pivotally linked to the truck frame, in combination, means for raising said movable frame comprising a pawl and ratchet device and means for connecting one element of said pawl and ratchet device to said handle so as to permit of operation of the device by movement of the handle, means for holding said movable frame in any one of a plurality of elevated positions comprising interengageable members, one of which is mounted on said crosshead and the other on said movable frame, and means for disengaging said members to permit descent of the movable frame, and means for controlling the descent of the frame when released.

WILLIAM STUEBING, Jr.